US012623350B2

(12) United States Patent

Chi et al.

(10) Patent No.: US 12,623,350 B2

(45) Date of Patent: May 12, 2026

(54) UNIVERSAL MANIPULATION INTERFACE

(71) Applicant: Toyota Research Institute, Inc., Los Altos, CA (US)

(72) Inventors: Cheng Chi, Mountain View, CA (US); Zhenjia Xu, Mountain View, CA (US); Eric A. Cousineau, Cambridge, MA (US); Siyuan Feng, Cambridge, MA (US); Benjamin Burchfiel, Somerville, MA (US); Russell Louis Tedrake, Needam, MA (US); Shuran Song, Stanford, CA (US); Chu Er Pan, Palo Alto, CA (US)

(73) Assignees: Toyota Research Institute, Inc., Los Altos, CA (US); Toyota Jidosha Kabushiki Kaisha, Toyota (JP); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 80 days.

(21) Appl. No.: 18/731,745

(22) Filed: Jun. 3, 2024

(65) Prior Publication Data

US 2025/0249594 A1 Aug. 7, 2025

Related U.S. Application Data

(60) Provisional application No. 63/548,607, filed on Feb. 1, 2024.

(51) Int. Cl.
B25J 9/16 (2006.01)
B25J 19/02 (2006.01)

(52) U.S. Cl.
CPC ............. B25J 9/1697 (2013.01); B25J 9/163 (2013.01); B25J 9/1664 (2013.01); B25J 19/023 (2013.01)

(58) Field of Classification Search
CPC ........ B25J 9/1697; B25J 9/163; B25J 9/1664; B25J 19/023; B25J 9/1612; G05B 19/423;
(Continued)

(56) References Cited

U.S. PATENT DOCUMENTS 8,805,581 B2    8/2014  Barajas et al.
10,913,154 B2   2/2021  Tan et al.
(Continued)

FOREIGN PATENT DOCUMENTS

EP         2735409 A1    10/2016

OTHER PUBLICATIONS

Chi C, Xu Z, Feng S, Cousineau E, Du Y, Burchfiel B, Tedrake R, Song S.; "Diffusion policy: Visuomotor policy learning via action diffusion". Sage Journals; 2023; The International Journal of Robotics Research. Jun. 2023:02783649241273668. (Year: 2023).*
(Continued)

*Primary Examiner* — Jaime Figueroa

(74) *Attorney, Agent, or Firm* — Christopher G. Darrow; Darrow Mustafa PC

(57) ABSTRACT

Systems, methods, and other embodiments described herein relate to an interface for training a visuomotor policy to be device agnostic and controlling a robotic device using the visuomotor policy. In one embodiment, a method includes collecting sensor data about a robotic manipulator within an environment. The method includes pre-processing the sensor data to compensate for an observation latency of at least one sensor associated with the robotic manipulator. The method includes generating actions for the robotic manipulator to perform a task according to the sensor data and a visuomotor policy. The method includes controlling the robotic manipulator, including compensating for execution latency of the robotic manipulator in performing the actions.

20 Claims, 8 Drawing Sheets

(58) Field of Classification Search
CPC ........... G05B 2219/36453; G05B 2219/37512; G05B 2219/40116
USPC ................. 700/245–264; 318/568.11–568.25
See application file for complete search history.

(56) References Cited

U.S. PATENT DOCUMENTS

| | | | |
|---|---|---|---|
| 11,472,025 B2 | 10/2022 | Kolluri et al. | |
| 11,605,026 B2 * | 3/2023 | Graves | G06N 3/006 |
| 11,782,442 B2 * | 10/2023 | Perrone | G05D 1/622 |
| | | | 700/245 |
| 11,789,466 B2 * | 10/2023 | Vemprala | G06N 3/047 |
| | | | 701/3 |
| 11,958,529 B2 * | 4/2024 | Mandlekar | G06N 3/088 |
| 2019/0126472 A1 * | 5/2019 | Tunyasuvunakool | B25J 9/161 |
| 2022/0055663 A1 * | 2/2022 | Buehler | B60W 30/18154 |
| 2022/0055689 A1 * | 2/2022 | Mandlekar | B60W 60/0025 |
| 2022/0197312 A1 * | 6/2022 | Vemprala | G06N 3/08 |
| 2023/0040018 A1 * | 2/2023 | Perrone | G05D 1/622 |
| 2023/0067841 A1 * | 3/2023 | Saharia | G06N 3/047 |
| 2023/0081738 A1 | 3/2023 | Straehle et al. | |
| 2023/0153607 A1 | 5/2023 | Bhutani et al. | |
| 2023/0241773 A1 | 8/2023 | Lian et al. | |

OTHER PUBLICATIONS

Rahimian et al.; The Effect of Visuomotor Latency on Steering Behavior in Virtual Reality; 2021; Frontiers Virtual Reality; Dec. 20, 2021. Sec. Virtual Reality and Human Behaviour; vol. 2—2021 | https://doi.org/10.3389/frvir.2021.727858 (Year: 2021).*
Levine et al.; End-to-End Training of Deep Visuomotor Policies; 2016; Journal of Machine Learning Research 17 (2016) 1-40 (Year: 2016).*
Florence et al; "Self-Supervised Correspondence in Visuomotor Policy Learning," in IEEE Robotics and Automation Letters, vol. 5, No. 2, pp. 492-499, Apr. 2020, doi: 10.1109/LRA.2019.2956365. (Year: 2020).*
Bahl, et al., "Human-to-Robot Imitation in the Wild", arXiv preprint arXiv:2207.09450, 2022, 15 pages.
Bahl, et al., "Affordances from Human Videos as a Versatile Representation for Robotics", Proceedings of the IEEE/CVF Conference on Computer Vision and Pattern Recognition, 2023, 13 pages.
Brohan, et al., "RT-1: Robotics Transformer for Real-World Control at Scale", arXiv preprint arXiv:2212.06817, 2022, 31 pages.
Brygo, et al., "Humanoid Robot Teleoperation with Vibrotactile based Balancing Feedback", Haptics: Neuroscience, Devices, Modeling, and Applications: 9th International Conference, EuroHaptics 2014, Versailles, France, Jun. 24-26, 2014, Proceedings, Part II 9, 2014, 8 pages.
Calli, et al., "The YCB Object and Model Set: Towards Common Benchmarks for Manipulation Research", 2015 International Conference on Advanced Robotics (ICAR), 2015, 8 pages.
Campos, et al., "Orb-slam3: An accurate open-source library for visual, visual-inertial, and multimap slam", IEEE Transactions on Robotics, 18 pages.
Chen, et al., "Learning generalizable robotic reward functions from "in-the-wild" human videos", arXiv preprint arXiv:2103.16817, 2021, 16 pages.
Chi, et al., "Diffusion policy: Visuomotor policy learning via action diffusion", Proceedings of Robotics: Science and Systems (RSS), 2023, 19 pages.
Doshi, et al., "On Hand-Held Grippers and the Morphological Gap in Human Manipulation Demonstration", arXiv preprint arXiv:2311.01832, 2023, 12 pages.
Dosovitskiy, et al., "An Image is Worth 16X16 Words: Transformers for Image Recognition at Scale", arXiv preprint arXiv:2010.11929, 2020, 22 pages.

Ebert, et al., "Bridge Data: Boosting Generalization of Robotic Skills with Cross-Domain Datasets", arXiv preprint arXiv:2109.13396, 2021, 7 pages.
Fang, et al., "Low-Cost Exoskeletons for Learning Whole-Arm Manipulation in the Wild", arXiv preprint arXiv:2309.14975, 2023, 12 pages.
Fu, et al., "Mobile ALOHA: Learning Bimanual Mobile Manipulation with Low-Cost Whole-Body Teleoperation", arXiv preprint arXiv:2401.02117, 2024, 20 pages.
Garrido-Jurado, et al., "Automatic generation and detection of highly reliable fiducial markers under occlusion", Pattern Recognition, 2014, 13 pages.
He, et al., "Deep Residual Learning for Image Recognition", 2015, 9 pages.
Jang, et al., "BC-Z: Zero-Shot Task Generalization with Robotic Imitation Learning", Conference on Robot Learning, 2022, 12 pages.
Kim, et al., "Giving Robots a Hand: Learning Generalizable Manipulation with Eye-in-Hand Human Video Demonstrations", arXiv preprint arXiv:2307.05959, 2023, 21 pages.
Ma, et al., "Towards Universal Visual Reward and Representation via Value-Implicit Pre-Training", arXiv preprint arXiv:2210.00030, 2022, 35 pages.
Mandlekar, et al., "ROBOTURK: A Crowdsourcing Platform for Robotic Skill Learning through Imitation", Conference on Robot Learning, 2018, 15 pages.
Nair, et al., "R3M: A Universal Visual Representation for Robot Manipulation", arXiv preprint arXiv:2203.12601, 2022, 18 pages.
Peternel, et al., "Learning of compliant human-robot interaction using full-body haptic interface", Advanced Robotics, 2013, 16 pages.
Praveena, et al., "Characterizing Input Methods for Human-to-robot Demonstrations", 2019 14th ACM/IEEE International Conference on Human-Robot Interaction, 2019, 10 pages.
Radford, et al., "Learning Transferable Visual Models From Natural Language Supervision", International conference on machine learning, 2021, 16 pages.
Ravichandar, et al., "Recent Advances in Robot Learning from Demonstration", Annual review of control, robotics, and autonomous systems, 2020, 34 pages.
Rosete-Beas, et al., "Latent Plans for Task-Agnostic Offline Reinforcement Learning", Conference on Robot Learning, 2023, 12 pages.
Sanches, et al., "Scalable, Intuitive Human to Robot Skill Transfer with Wearable Human Machine Interfaces: On Complex, Dexterous Tasks", 2023 IEEE/RSJ International Conference on Intelligent Robots and Systems, 2023, 8 pages.
Schmeckpeper, et al., "Reinforcement Learning with Videos: Combining Offline Observations with Interaction", arXiv preprint arXiv:2011.06507, 2020, 16 pages.
Schmeckpeper, et al., "Learning Predictive Models From Observation and Interaction", European Conference on Computer Vision, 2020, 17 pages.
Seo, et al., "Deep Imitation Learning for Humanoid Loco-manipulation through Human Teleoperation", 2023 IEEE-RAS 22nd International Conference on Humanoid Robots, 2023, 9 pages.
Shafiullah, et al., "On Bringing Robots Home", arXiv preprint arXiv:2311.16098, 2023, 32 pages.
Shao, et al., "Concept2Robot: Learning Manipulation Concepts from Instructions and Human Demonstrations," The International Journal of Robotics Research, 2021, 11 pages.
Shaw, et al., "VideoDex: Learning Dexterity from Internet Videos", Conference on Robot Learning, 2023, 12 pages.
Song, et al., "Grasping in the Wild: Learning 6DoF Closed-Loop Grasping from Low-Cost Demonstrations", Robotics and Automation Letters, 2020, 8 pages.
Su, et al., "Learning to Switch between Sensorimotor Primitives using Multimodal Haptic Signals", From Animals to Animats 14: 14th International Conference on Simulation of Adaptive Behavior, 2016, 13 pages.
Suh, et al., SEED: Series Elastic End Effectors in 6D for Visuotactile Tool Use, 2022 IEEE/RSJ International Conference on Intelligent Robots and Systems, 2022, 8 pages.

(56) References Cited

OTHER PUBLICATIONS

Toedtheide, et al., "A Force-Sensitive Exoskeleton for Teleoperation: An Application in Elderly Care Robotics", 2023 IEEE International Conference on Robotics and Automation, 2023, 7 pages.

Walke, et al., "BridgeData V2: A Dataset for Robot Learning at Scale", Conference on Robot Learning, 2023, 14 pages.

Wang, et al., "MimicPlay: Long-Horizon Imitation Learning by Watching Human Play", arXiv preprint arXiv:2302.12422, 2023, 21 pages.

Wong, et al., "Error-Aware Imitation Learning from Teleoperation Data for Mobile Manipulation", Conference on Robot Learning, 2022, 12 pages.

Wu, et al., "GELLO: A General, Low-Cost, and Intuitive Teleoperation Framework for Robot Manipulators", arXiv preprint arXiv:2309.13037, 2023, 8 pages.

Wyrobek, et al., "Towards a Personal Robotics Development Platform: Rationale and Design of an Intrinsically Safe Personal Robot", 2008 IEEE International Conference on Robotics and Automation, 2008, 6 pages.

Xiao, et al., "Masked Visual Pre-training for Motor Control", arXiv preprint arXiv:2203.06173, 2022, 12 pages.

Xiong, et al., "Learning by Watching: Physical Imitation of Manipulation Skills from Human Videos", 2021 IEEE/RSJ International Conference on Intelligent Robots and Systems, 2021, 8 pages.

Xu, et al., "XSkill: Cross Embodiment Skill Discovery", 7th Annual Conference on Robot Learning, 2023, 20 pages.

Young, et al., "Visual Imitation Made Easy", Conference on Robot Learning, 2021, 14 pages.

Zhang, et al., "Deep Imitation Learning for Complex Manipulation Tasks from Virtual Reality Teleoperation", 2018 IEEE International Conference on Robotics and Automation, 2018, 9 pages.

Zhang, et al., "Benefit of large field-of-view cameras for visual odometry", 2016 IEEE International Conference on Robotics and Automation, 2016, 9 pages.

Zhao, et al., "Learning Fine-Grained Bimanual Manipulation with Low-Cost Hardware", arXiv preprint arXiv:2304.13705, 2023, 18 pages.

Zhu, et al., "VIOLA: Imitation Learning for Vision-Based Manipulation with Object Proposal Priors", 6th Annual Conference on Robot Learning, 2022, 15 pages.

Zhao, et al., "An Efficient Generalizable Framework for Visuomotor Policies", arXiv preprint arXiv:2401.09258, 2024, 15 pages.

Mani et al., "DiffClone: Enhanced Behaviour Cloning in Robotics with Diffusion-Driven Policy Learning", arXiv preprint arXiv:2401.09243, 2024, 13 pages.

* cited by examiner

500

UNIVERSAL MANIPULATION INTERFACE

CROSS-REFERENCE TO RELATED APPLICATIONS

This application claims benefit of U.S. Provisional Application No. 63/548,607, filed on, Feb. 1, 2024, which is herein incorporated by reference in its entirety.

TECHNICAL FIELD

The subject matter described herein relates, in general, to systems and methods for controlling robotic devices to perform tasks and, more particularly, to training a visuomotor policy in a way that is device-agnostic.

BACKGROUND

Training devices, such as robotic arms with manipulators, to perform tasks can be complex. For example, various approaches attempt to train a policy for a device through demonstrating complex manipulation skills using targeted lab-based datasets generated through manual operation by teleoperation or leveraging unstructured videos of a person performing the task. However, these approaches have many drawbacks, including high setup costs (e.g., expert operator and teleoperation hardware), large embodiment gaps (e.g., between humans and robots), and so on.

Moreover, using one type of device to acquire information for training a policy for use by another type of device also suffers from difficulties. For example, the data collected in this way does not generally transfer and results in a lack of action diversity where examples are constrained to simple actions or quasi-static pick-and-place actions due to issues with insufficient visual context, action precision, latency discrepancies, and insufficient policy representation. Therefore, accurately training a robotic device to perform different tasks remains difficult.

SUMMARY

Example systems and methods relate to an interface for training a visuomotor policy to be device agnostic and controlling a robotic device using the visuomotor policy. As noted previously, various approaches for acquiring training data and controlling a robotic device using a policy trained on the data encounter difficulties that result in high costs and other issues. For example, because of the way in which the data is collected there may be large embodiment gaps and/or the learnable actions may be constrained to limited complexity. In general, this leads to limited usefulness in attempting to leverage such data for training, thereby leaving manual or other costly options to configure a device.

Therefore, in various arrangements, an inventive system implements a handheld gripper to acquire demonstration data about a task and train a visuomotor policy in a way that the policy is device agnostic and further overcomes the other noted difficulties. For example, the system acquires the demonstration data in a format that relates to the gripper itself as opposed to a statically mounted camera within an environment in which the gripper is in use. That is, the sensors that perceive/generate the demonstration data are integrated with the gripper in order to observe an end-effector and gripper position. This provides a direct perception of the actions of the device without consideration to device-specific elements or consideration of the environment more broadly that otherwise need to be translated on a per-device basis. The sensors can include, for example, an inertial measurement unit (IMU), a camera, position sensors for the gripper, and so on. Accordingly, the system collects the demonstration data of the use of the handheld gripper performing a particular task, such as folding clothing, washing dishes, tossing an object, rearranging objects, picking and placing an object, and so on, from the perspective of the device itself.

Once collected, the demonstration data can then be processed into a sequence of synchronized information that pairs actions with observations and generally includes, in at least one approach, images, 6-degree of freedom (6-DOF) end-effector pose, gripper width, gripper velocity, etc. The system may then perform kinematic filtering on the demonstration data to transform the demonstration data into a set of trajectories that is device agnostic. Thereafter, the system trains a visuomotor policy to generate robot behaviors via a conditional denoising diffusion process on a robot action space. The resulting visuomotor policy is, as mentioned, device agnostic and can be transferred to other types of robotic manipulators.

For example, the system can then implement the visuomotor policy with a robotic manipulator to perform the learned task. In general, the system collects sensor data that includes at least images and gripper positions. Because the latencies between the handheld gripper and the robotic manipulator are distinct in both observation latencies and execution latencies, the system compensates for these latencies to ensure accurate control. In at least one approach, the system pre-processes the sensor data to align different aspects of the data according to the observation latency. In one example, the system aligns the data according to an element of the stream with a highest latency (e.g., a camera). That is, different observation streams (e.g., image, end-effector pose, gripper width) are captured by distributed microcontrollers with no centralized clock, which results in different latencies. Accordingly, the system aligns the observations with respect to a highest latency stream to provide synchronized observations.

The system provides the synchronized observations as input to the visuomotor policy that was previously trained on the task, and the visuomotor policy outputs a sequence of actions for controlling the robotic manipulator. The actions may be provided in a relative action format where each subsequent action is relative to the prior action at a defined prior time point as opposed to being absolute actions that are defined in relation to a robot base or other static element in the environment. In any case, the system further accounts for the execution latency when using the sequence of actions to control the robotic manipulator. In one approach, the system adjusts the timing of the actions by communicating the actions at adjusted times to cause a desired timing in the motion of the manipulator. The execution latency is device-specific and relates to latencies in how the robotic manipulator moves, for example, an arm, a gripper, and so on relative to when an action is communicated. In this way, the system is able to implement an interface that is device-agnostic and able to transfer learning of tasks from one device to another without the noted difficulties.

In one embodiment, an interface system is disclosed. The interface system includes one or more processors and a memory communicably coupled to the one or more processors. The memory stores a control module including instructions that, when executed by the one or more processors, cause the one or more processors to collect sensor data about a robotic manipulator within an environment. The instructions include instructions to pre-process the sensor data to compensate for an observation latency of at least one sensor associated with the robotic manipulator. The instructions include instructions to generate actions for the robotic manipulator to perform a task according to the sensor data and a visuomotor policy. The instructions include instructions to control the robotic manipulator, including compensating for execution latency of the robotic manipulator in performing the actions.

In one embodiment, a non-transitory computer-readable medium including instructions that, when executed by one or more processors, cause the one or more processors to perform various functions is disclosed. The instructions include instructions to collect sensor data about a robotic manipulator within an environment. The instructions include instructions to pre-process the sensor data to compensate for an observation latency of at least one sensor associated with the robotic manipulator. The instructions include instructions to generate actions for the robotic manipulator to perform a task according to the sensor data and a visuomotor policy. The instructions include instructions to control the robotic manipulator, including compensating for execution latency of the robotic manipulator in performing the actions.

In one embodiment, a method is disclosed. The method includes collecting sensor data about a robotic manipulator within an environment. The method includes pre-processing the sensor data to compensate for an observation latency of at least one sensor associated with the robotic manipulator. The method includes generating actions for the robotic manipulator to perform a task according to the sensor data and a visuomotor policy. The method includes controlling the robotic manipulator, including compensating for execution latency of the robotic manipulator in performing the actions.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

4

Figure 8:
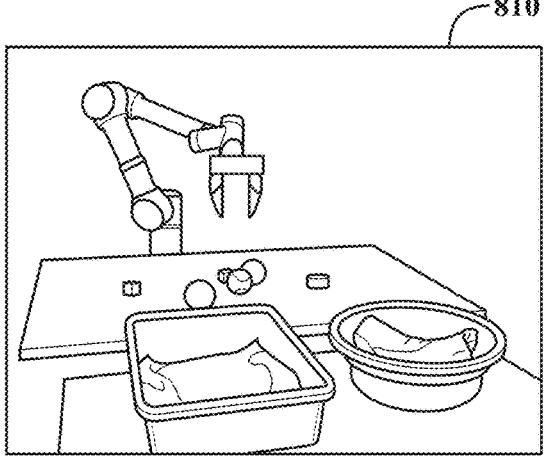
Figure 8:
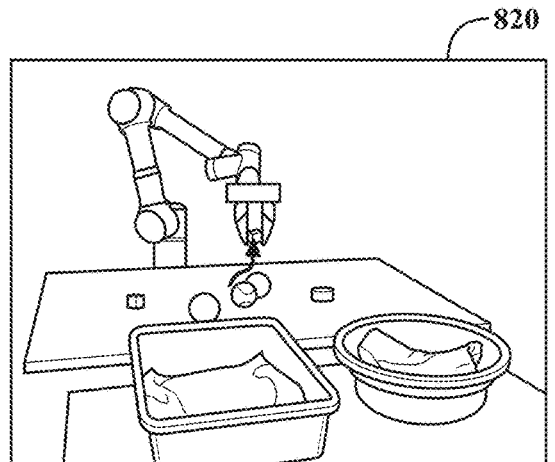
Figure 8:
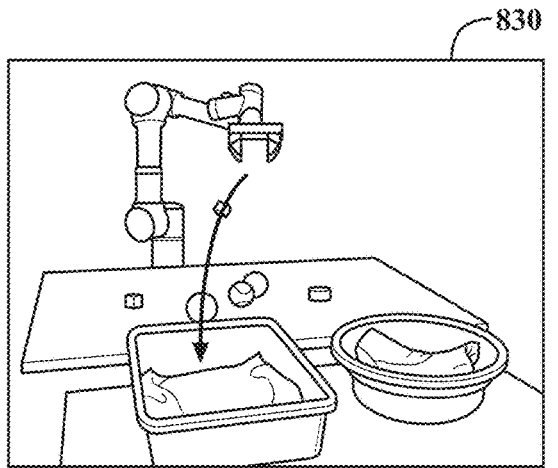
Figure 8:
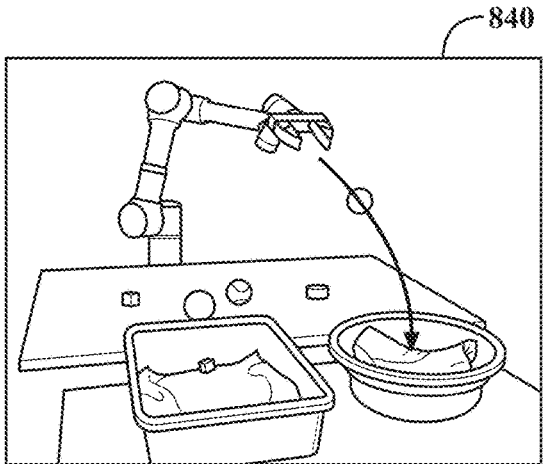

FIG. 8 illustrates one example of the interface system controlling a robotic device to toss a ball.

DETAILED DESCRIPTION

Systems, methods, and other embodiments associated with training a visuomotor policy to be device agnostic and controlling a robotic device using the visuomotor policy are disclosed. As noted previously, various approaches for acquiring training data and controlling a robotic device using a policy trained on the data encounter difficulties that result in high costs and other issues. For example, because of the way in which the data is collected there may be large embodiment gaps and/or the learnable actions may be constrained to limited complexity. In general, this leads to undesirable limited usefulness in attempting to leverage such data for training, thereby leaving manual or other costly options to configure a device.

Therefore, in various arrangements, an inventive system implements a handheld gripper to acquire demonstration data about a task and train a visuomotor policy in a way that the policy is device agnostic and further overcomes the other noted difficulties. For example, the system acquires the demonstration data in a format that relates to the gripper itself as opposed to a statically mounted camera within an environment in which the gripper is in use. That is, the sensors that perceive/generate the demonstration data are integrated with the gripper in order to observe an end-effector and gripper position. This provides a direct perception of the actions of the device without consideration to device-specific elements or consideration of the environment more broadly that otherwise need to be translated on a per-device basis. The sensors can include, for example, an inertial measurement unit (IMU), a camera, position sensors for the gripper, and so on. Accordingly, the system collects the demonstration data of the use of the handheld gripper performing a particular task, such as folding clothing, washing dishes, tossing an object, rearranging objects, picking and placing an object, and so on from the perspective of the device itself.

Once collected the demonstration data can then be processed into a sequence of synchronized information that pair actions with observations and generally includes, in at least one approach, images, 6-degree of freedom (6-DOF) end-effector pose, gripper width, gripper velocity, etc. The system may then perform kinematic filtering on the demonstration data to transform the demonstration data into a set of trajectories that is device agnostic. Thereafter, the system trains a visuomotor policy to generate robot behaviors via a conditional denoising diffusion process on a robot action space. The resulting visuomotor policy is, as mentioned, device agnostic and can be transferred to other types of robotic manipulators.

For example, the system can then implement the visuomotor policy with a robotic manipulator to perform the learned task. In general, the system collects sensor data that includes at least images and gripper positions. Because the latencies between the handheld gripper and the robotic manipulator are distinct in both observation latencies and execution latencies, the system compensates for these latencies to ensure accurate control. In at least one approach, the system pre-processes the sensor data to align different aspects of the data according to the observation latency. In one example, the system aligns the data according to an element of the stream with a highest latency (e.g., a camera). That is, different observation streams (e.g., image, end-effector pose, gripper width) are captured by distributed microcontrollers with no centralized clock, which results in different latencies. Accordingly, the system aligns the observations with respect to a highest latency stream to provide synchronized observations.

The system provides the synchronized observations as input to the visuomotor policy that was previously trained on the task and the visuomotor policy outputs a sequence of actions for controlling the robotic manipulator. The actions may be provided in a relative action format where each subsequent action is relative to the prior action at a defined timepoint as opposed to being absolute actions that are defined in relation to a robot base or other static element in the environment. In any case, the system further accounts for the execution latency when using the sequence of actions to control the robotic manipulator. In one approach, the system adjusts the timing of the actions by communicating the actions at adjusted times to cause a desired timing in the motion of the manipulator. The execution latency is device specific and relates to latencies in how the robotic manipulator moves, for example, an arm, a gripper, and so on relative to when an action is communicated. In this way, the system is able to implement an interface that is device-agnostic and able to transfer learning of tasks from one device to another without the noted difficulties.

Figure 1:
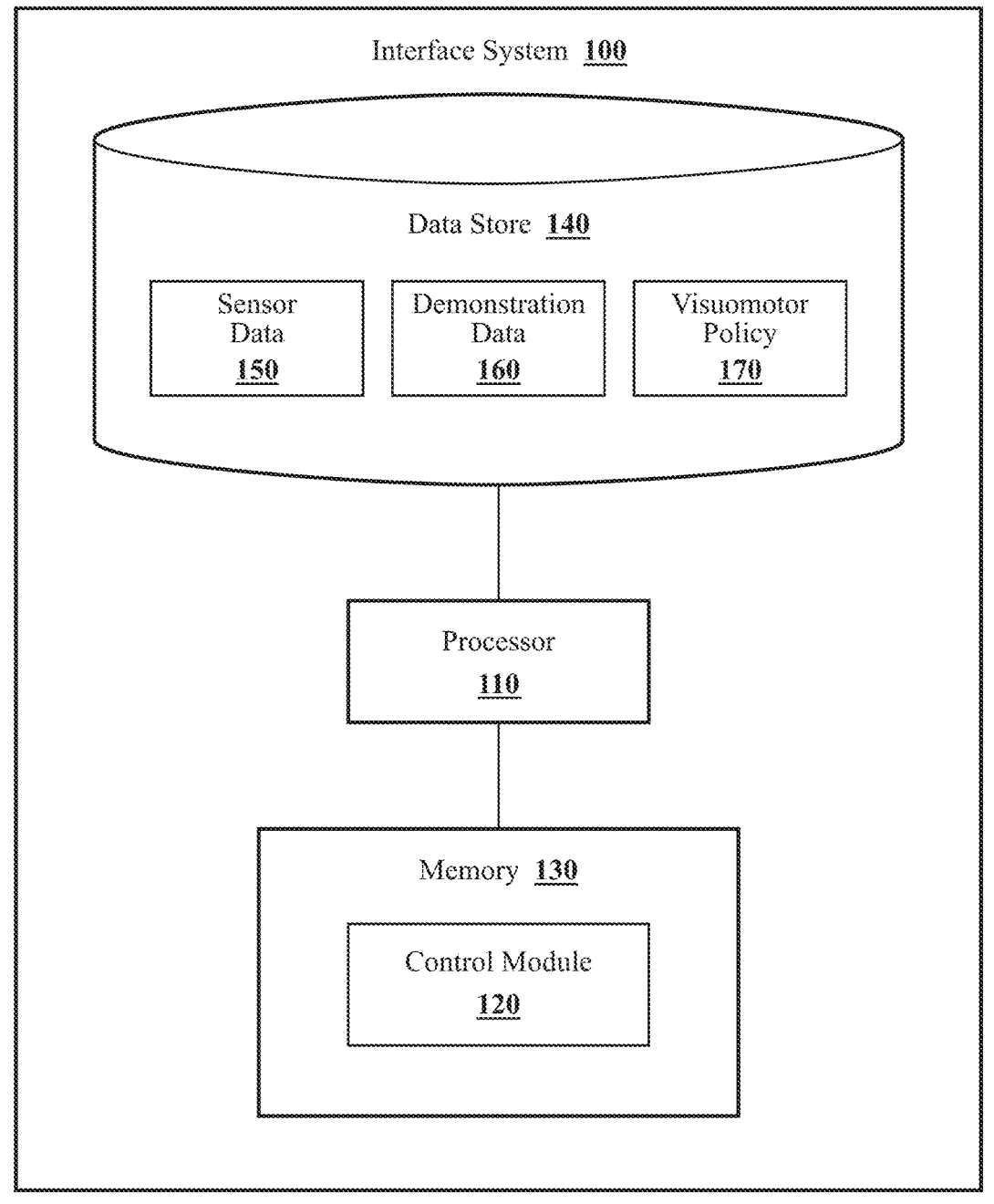
FIG. 1 illustrates one embodiment of an interface system associated with training a visuomotor policy and controlling a robotic device using the visuomotor policy.

Referring to FIG. 1, one example of an interface system 100 that functions to train a visuomotor policy and/or control a robotic manipulator using a visuomotor policy is shown. While depicted as a standalone component, in one or more embodiments, the interface system 100 is cloud-based and thus can include elements that are distributed among different locations. In general, the interface system 100 is implemented to acquire demonstration data from a handheld gripper that is used to demonstrate a specific task for transfer to another robotic device (e.g., a manipulator). The interface system 100 may process the demonstration data into training data that is then applied through a machine-learning process to generate a visuomotor policy that is device-agnostic. The interface system 100 can then use the visuomotor policy along with compensating for specifics of a particular robotic manipulator to control the manipulator to perform the learned task. The noted functions and methods will become more apparent with a further discussion of the figures.

With further reference to FIG. 1, the interface system 100 is shown as including a processor 110. Accordingly, the processor 110 may be a part of the interface system 100, or the interface system 100 may access the processor 110 through a data bus or another communication path. In one or more embodiments, the processor 110 is an application-specific integrated circuit (ASIC) that is configured to implement functions associated with a control module 120. In general, the processor 110 is an electronic processor, such as a microprocessor, that is capable of performing various functions as described herein. In one embodiment, the interface system 100 includes a memory 130 that stores the control module 120 and/or other modules that may function in support of training and/or control. The memory 130 is a random-access memory (RAM), read-only memory (ROM), a hard disk drive, a flash memory, or other suitable memory for storing the control module 120. The control module 120 is, for example, computer-readable instructions that, when executed by the processor 110, cause the processor 110 to perform the various functions disclosed herein. In further arrangements, the control module 120 is a logic, integrated circuit, or another device for performing the noted functions that includes the instructions integrated therein.

Furthermore, in one embodiment, the interface system 100 includes a data store 140. The data store 140 is, in one arrangement, an electronic data structure stored in the memory 130 or another electronic medium, and that is configured with routines that can be executed by the processor 110 for analyzing stored data, providing stored data, organizing stored data, and so on. Thus, in one embodiment, the data store 140 stores data used by the control module 120 in executing various functions. For example, as depicted in FIG. 1, the data store 140 includes sensor data 150, demonstration data 160, and a visuomotor policy 170 along with, for example, other information that is used and/or produced by the control module 120. While the interface system 100 is illustrated as including the various elements, it should be appreciated that one or more of the illustrated elements may not be included within the data store 140 in various implementations. For example, the interface system 100, in one approach, may not include the demonstration data 160 and instead applies the visuomotor policy to the sensor data 150 to generate sequences of actions for controlling the robotic manipulator. In any case, the interface system 100 stores various data elements in the data store 140 to support functions of the control module 120.

Continuing with the highlighted data elements, the sensor data 150 includes, for example, information collected from sensors associated with a particular device. That is, in various implementations, the content of the sensor data 150 depends on the sensors implemented by the particular device. In the context of the handheld gripper for collection of training information, the sensor data 150 includes information from, for example, an integrated camera and IMU sensor (accelerometer and gyroscope). The camera generates RGB images, and the IMU generates acceleration, orientation, and angular rates.

Figure 2A:
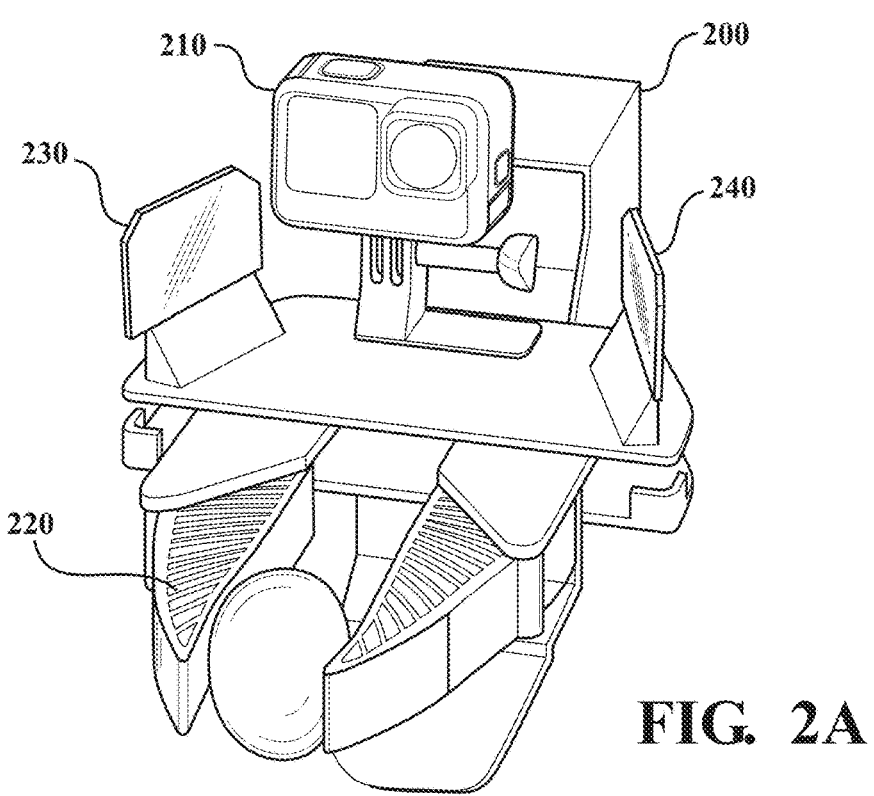
FIG. 2A illustrates one example of a handheld gripper.
Figure 2B:
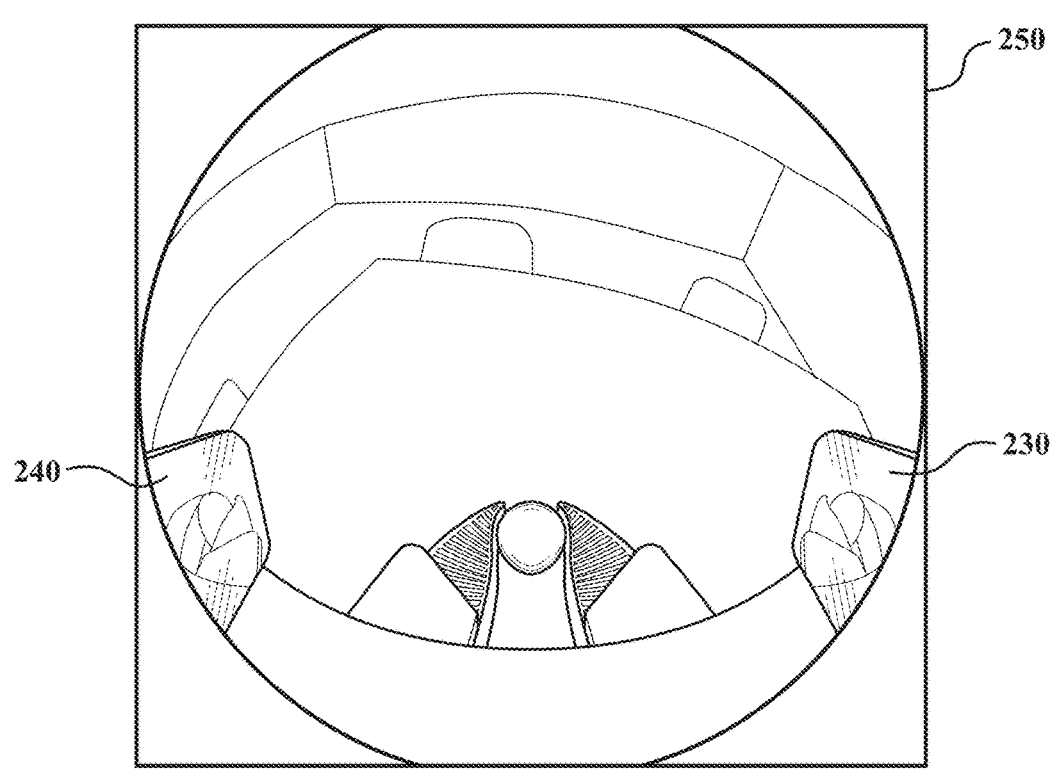
FIG. 2B depicts an example image acquired from the handheld gripper of FIG. 2A.
Figure 3:
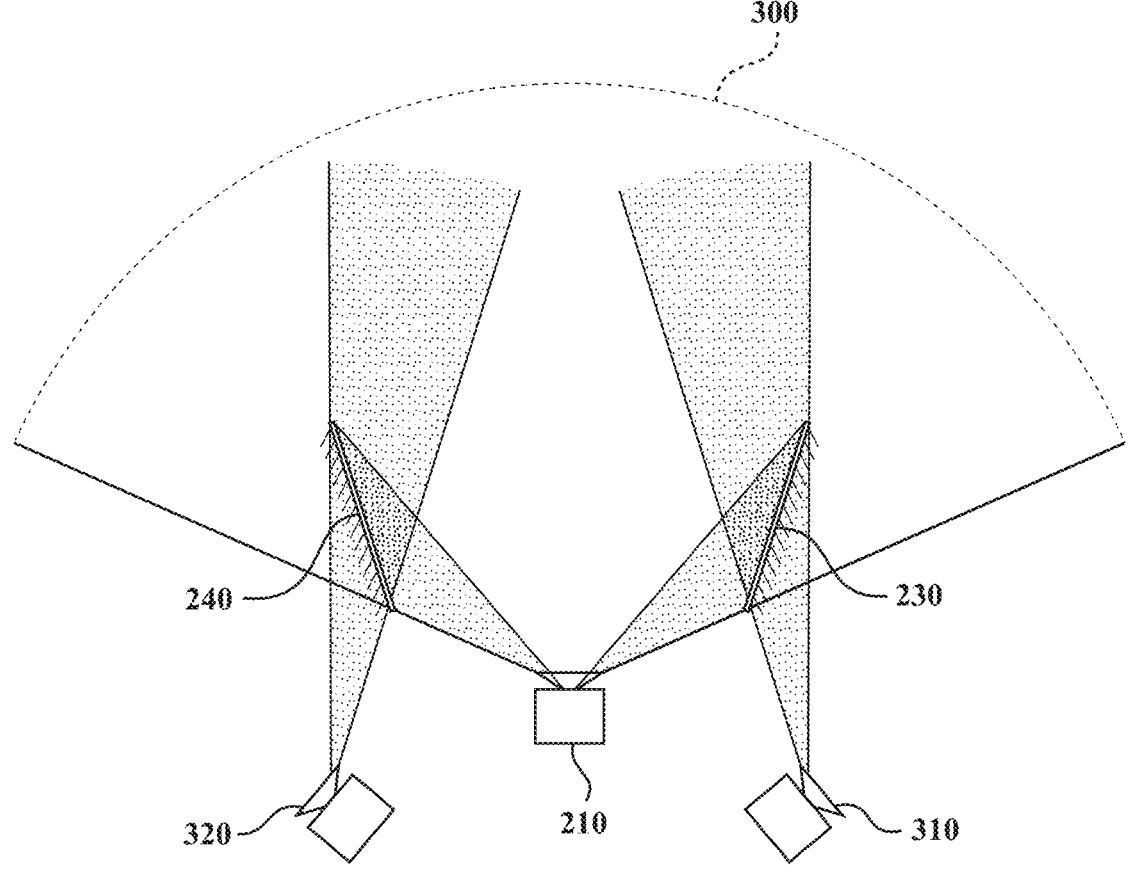
FIG. 3 is a diagram illustrating a field-of-view of the camera from the handheld gripper of FIG. 2A.

As one example of the particular form of the RGB images generated by the camera of the gripper, consider the configuration of the gripper in FIG. 2A and an example image of FIG. 2B. FIG. 2A shows a gripper 200 that includes a camera 210 mounted in a central location on the gripper 200 so as to have a field-of-view that includes an end-effector 220 that is able to open and close. The field-of-view of the camera 210 further includes mirrors 230 and 240. The mirrors 230 and 240 function to provide implicit stereo depth. That is, the camera 210, in one approach, has an ultra-wide angle lens (e.g., 150 degrees) that captures a field-of-view that includes the mirrors 230-240. As shown in FIG. 3, a field-of-view 300 of the camera 210 encompasses the mirrors 230-240, which then function to reflect portions of the field-of-view 300 in a way that the reflections can be considered "virtual" cameras 310/320 that provide independent views that then form a stereo pair. That is, the view through each of the mirrors 230-240 creates the virtual cameras 310/320, whose pose are reflected along the mirror planes with respect to the camera 210. This effectively provides cameras, in a virtual form, with different optical centers. A resulting image 250 is shown in FIG. 2B.

With further reference to the gripper 200, the gripper 200 can include fiducial markers on the end-effectors 220 to measure grasp width directly from the images that capture the fiducial markers. As noted, the camera lens is ultra-wide view, in the illustrated example, and may be a fish-eye lens. Additionally, the jaws of the end-effector 220 may be controlled in a continuous manner to adjust the end-effector width. Accordingly, for the gripper 200, the sensor data 150 that is collected by the system 100 includes the RGB images and the IMU information. From this information, additional data can be derived, such as the 6-DOF pose, the gripper width, and so on.

In the context of the interface system 100 being implemented with a robotic manipulator to control the manipulator in performing tasks, the interface system 100 collects the sensor data 150 according to an arrangement of sensors available with the robotic manipulator. In general, the sensor data 150 is, for example, intended to mimic that of the gripper, but in various arrangements, the sensor data 150 collected during implementation may include additional or varied inputs. For example, the sensor data 150, in addition to RGB images, can include position sensors for portions of an arm of a robotic manipulator, gripper widths, and so on. In such a case, the interface system 100 may adjust the sensor data 150 to align with a format that can be input to the visuomotor policy 170 (i.e., to match a format, frequency, etc.).

The demonstration data 160, in at least one approach, further includes information derived from the sensor data 150 for training. That is, in one approach, the interface system 100 performs simultaneous localization and mapping (SLAM) of the sensor data 150 to derive poses of the end-effector at separate points in time comprising a sequence. The control module 120 of the interface system 100 includes, in at least one arrangement, instructions that cause the processor 110 to analyze the RGB images and the IMU data to generate the 6-DOF poses according to SLAM. In one approach, the interface system 100 implements ORB-SLAM3 or another variation of SLAM. In particular, ORB-SLAM3 provides multi-map data association that permits the interface system 100 to match and use elements from separate mapping sessions. Moreover, the implemented version of SLAM permits tracking for a short period of time, even if visual tracking fails due to motion blur or a lack of visual features. This permits the interface system 100 to capture and deploy highly dynamic actions, including tossing. Furthermore, the joint visual-inertial optimization of the SLAM approach permits the direct recovery of real metric scale, which facilitates precision and inter-gripper pose proprioception. In any case, the control module 120 pairs observations and actions of the handheld gripper together to provide sequences comprising RGB images, 6 DOF end-effector poses, gripper widths, and gripper velocities as the demonstration data 160. This data can then be used to train the visuomotor policy 170.

As will be discussed further subsequently, the control module 120, in at least one arrangement, further processes the demonstration data 160 to find a subset of trajectories that are valid for different robot hardware. That is, the control module 120 performs kinematic-based filtering to recover trajectories that are device-agnostic. In particular, for example, in environments where the robot base location and embodiment are known, the absolute end-effector pose recovered by SLAM allows kinematics and dynamics feasibility filtering of the demonstration data 160. Subsequently, training on the filtered demonstration data 160 results in the visuomotor policy 170 being compliant with embodiment-specific constraints.

The control module 120 trains the visuomotor policy 170 according to imitation learning using the demonstration data 160 to generate a device-agnostic policy for manipulator control. The visuomotor policy 170 produces a sequence of actions corresponding to the inputs of the demonstration data 160 or the sensor data 150 for inference. The visuomotor policy 170 is, for example, a Diffusion Policy but may also take other forms, such as an Action Chunking with Transformers (ACT) policy. The diffusion policy represents a way of generating robot behavior by representing a robot's visuomotor policy as a conditional denoising diffusion process. The diffusion policy learns the gradient of the action-distribution score function and iteratively optimizes with respect to the gradient field during inference via a series of stochastic Langevin dynamics steps. In this way, the diffusion policy provides graceful handling of multimodal action distributions suitable for high dimensional action spaces while also providing training stability.

Figure 4:
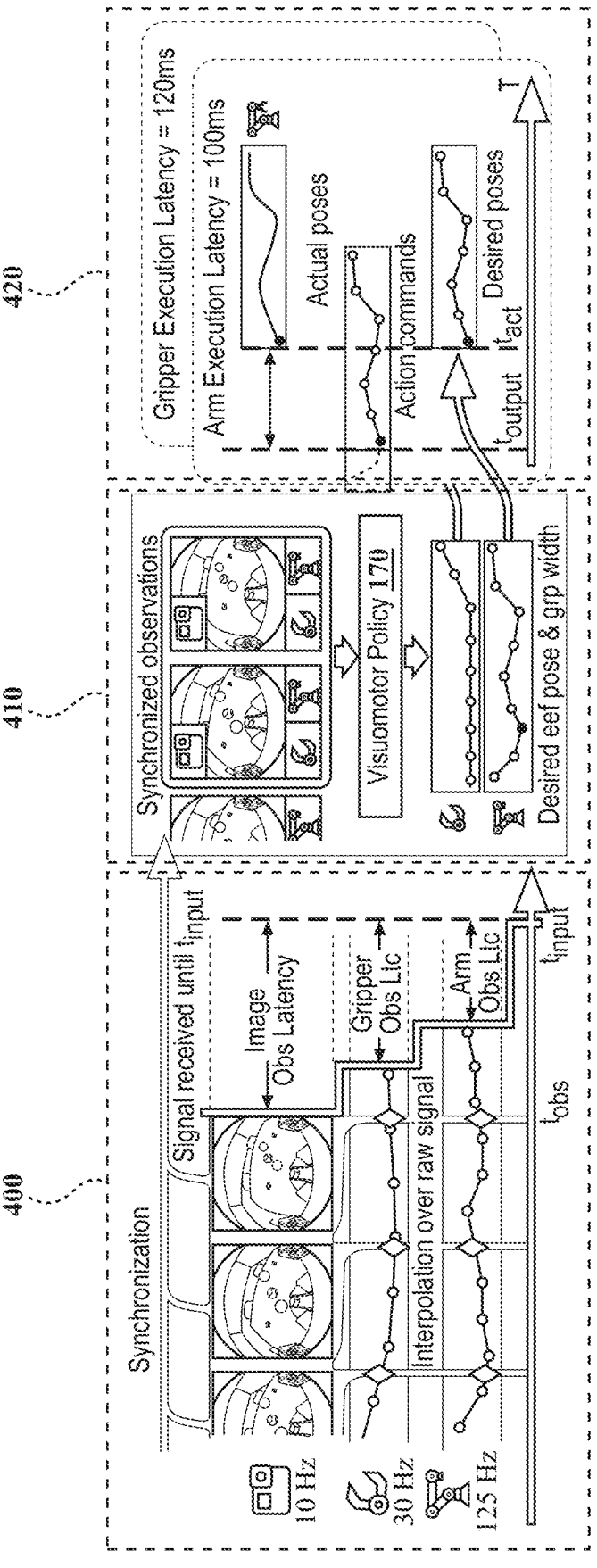
FIG. 4 is a diagram illustrating the compensation of various latencies when generating actions using the visuomotor policy.

As further discussion of the interface system 100 and how the system implements the visuomotor policy 170 to be agnostic to underlying robotic hardware platforms, consider FIG. 4.

In FIG. 4, an abstracted representation of observation latencies 400, a policy interface 410, and execution latencies 420 are illustrated. Because the latency of hardware elements, such as cameras, robot controllers, grippers, etc., is variable across different system deployments (e.g., 1 ms to 100 or more ms), the implementation of the visuomotor policy 170 as a device-agnostic policy alone is generally not sufficient to provide for implementing the visuomotor policy 170 with various hardware platforms (e.g., different robotic manipulators). Accordingly, as shown in FIG. 4, the interface system 100 accounts for latencies in different forms to facilitate implementation.

In regards to the observation latency 400, the control module 120 compensates for the latencies within the stream of sensor data 150. That is, the control module 120 synchronizes the different observation streams with physically measured latencies. Accordingly, the system 100 may, for example, as a pre-configuration function, determine the latencies of the separate streams. Within the context of a robotic manipulator, the separate observation streams (e.g., RGB image, end-effector pose, gripper width) are captured by distributed microcontrollers with no centralized clock, which results in different latencies between the streams. Thus, the system 100 can measure the latencies of the observation streams to determine the observation latencies. In one approach, the interface system 100 uses a rolling QR code that encodes a timestamp to measure the camera latency where a difference between the image arrival timestamp and the decoded QR code indicates camera latency. Other latencies may be determined using separate means, such as Ethernet round-trip times, and so on.

In any case, using the measured observation latencies, the control module 120 can compensate for latencies during inference by aligning all observations with respect to a highest latency (e.g., the camera—150 ms). In particular, the control module 120 down-samples the highest latency stream (e.g., RGB images) to a desired frequency, and then uses the capture timestamp of each observation to linearly interpolate gripper and proprioception streams. In bimanual systems, the control module 120 can soft-synchronize two cameras by, for example, finding the nearest neighbor frames, which can be off by a maximum of $\frac{1}{60}$ seconds. As a result, the control module 120 compensates for the observation latencies and provides a synchronized observation stream to the visuomotor policy as shown in 410.

Figure 5:
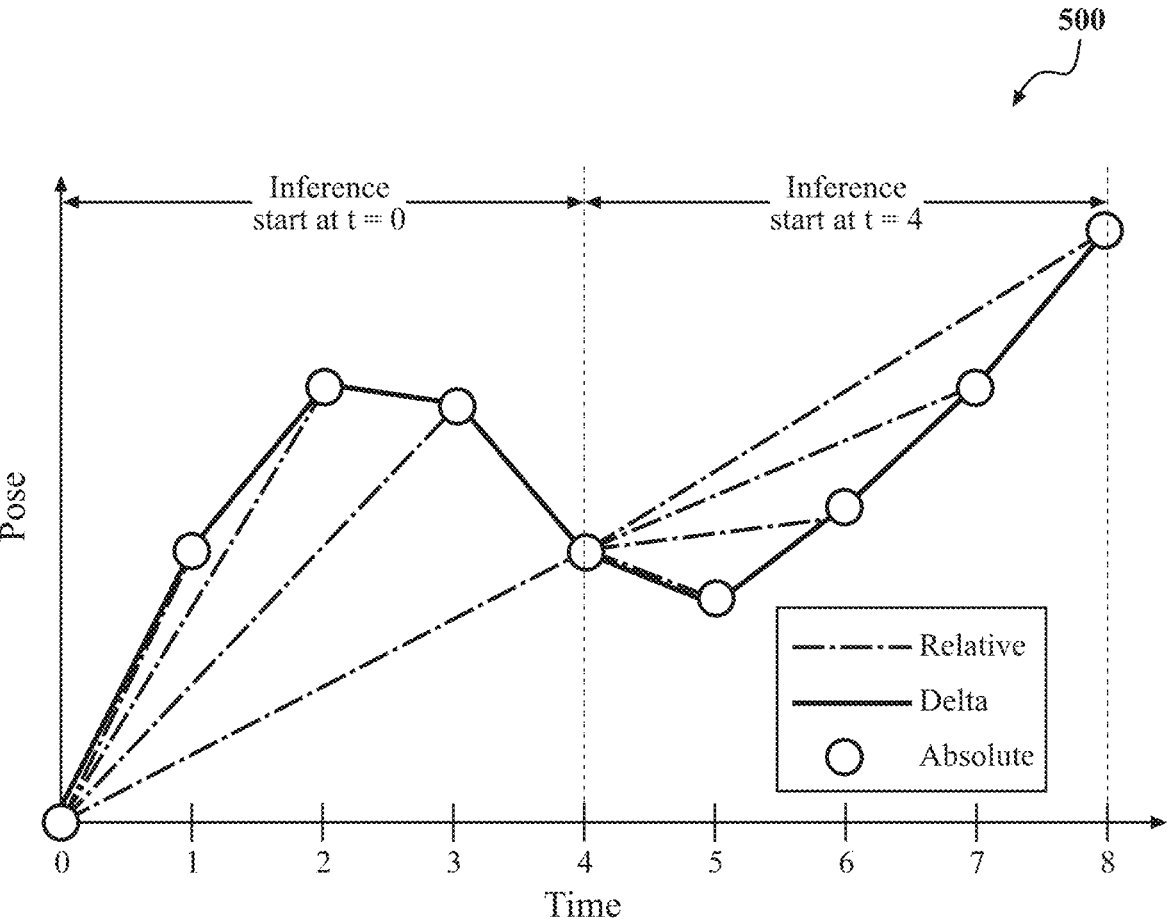
FIG. 5 is a graph illustrating relative trajectory action in comparison to other action formats.

Accordingly, the control module 120 accepts the sensor data 150 that has been synchronized for observation latencies and processes the synchronized sensor data 150 according to the visuomotor policy 170. The visuomotor policy 170 outputs a sequence of synchronized end-effector poses and gripper widths. As an additional aspect of the actions generated by the visuomotor policy 170, consider FIG. 5. FIG. 5 illustrates a graph 500 of poses at separate points in time. In particular, the graph 500 illustrates how the control module 120 provides the actions from the visuomotor policy 170 according to relative poses between two grippers positions. This relative trajectory action relates each action in a sequence is relative to the same current end-effector pose for each inference step. This is in opposition to a delta action representation that provides each action step relative to its immediate previous action, therefore accumulating errors. Furthermore, absolute action require a global coordinate frame for all actions, which is difficult to define for in-the-wild data collection.

In any case, because any given set of hardware, such as a specific robotic manipulator, can only track the desired pose sequence up to an execution latency, which varies between different hardware arrangements, the control module 120 compensates for the execution latency. To make sure the robotic manipulator (i.e., arm and gripper) reaches the desired pose at the desired time as given by the visuomotor policy 170, the control module 120 sends the commands ahead of time to compensate for the execution latency as shown in 420 of FIG. 4. Thus, in one or more arrangements, the interface system 100 may perform pre-configuration to calibrate the execution latency of the robotic manipulator. For example, the control module 120 may teleoperate the hardware and record the resulting sequence of desired poses and actual poses. The system 100 can measure the execution latency using the optimal alignment between the desired and actual poses, subtracted by the hardware-specific observation latency.

Therefore, during operation, the control module 120 uses the visuomotor policy 170 to predict the action sequence starting at the last step of observation $t_{obs}$. The first few actions predicted may be immediately outdated due to observation latency $t_{input}$-$t_{obs}$, policy inference latency $t_{output}$-$t_{input}$ and execution latency $t_{act}$-$t_{output}$. Accordingly, the control module 120 may simply discard the outdated actions and execute actions with the desired timestamp after $t_{act}$ for the separate hardware elements, as shown at 420 in FIG. 4. In this way, the interface system 100 compensates for the execution latency and permits the use of the visuomotor policy 170 on different robotic devices independent of the hardware arrangement.

Figure 6:
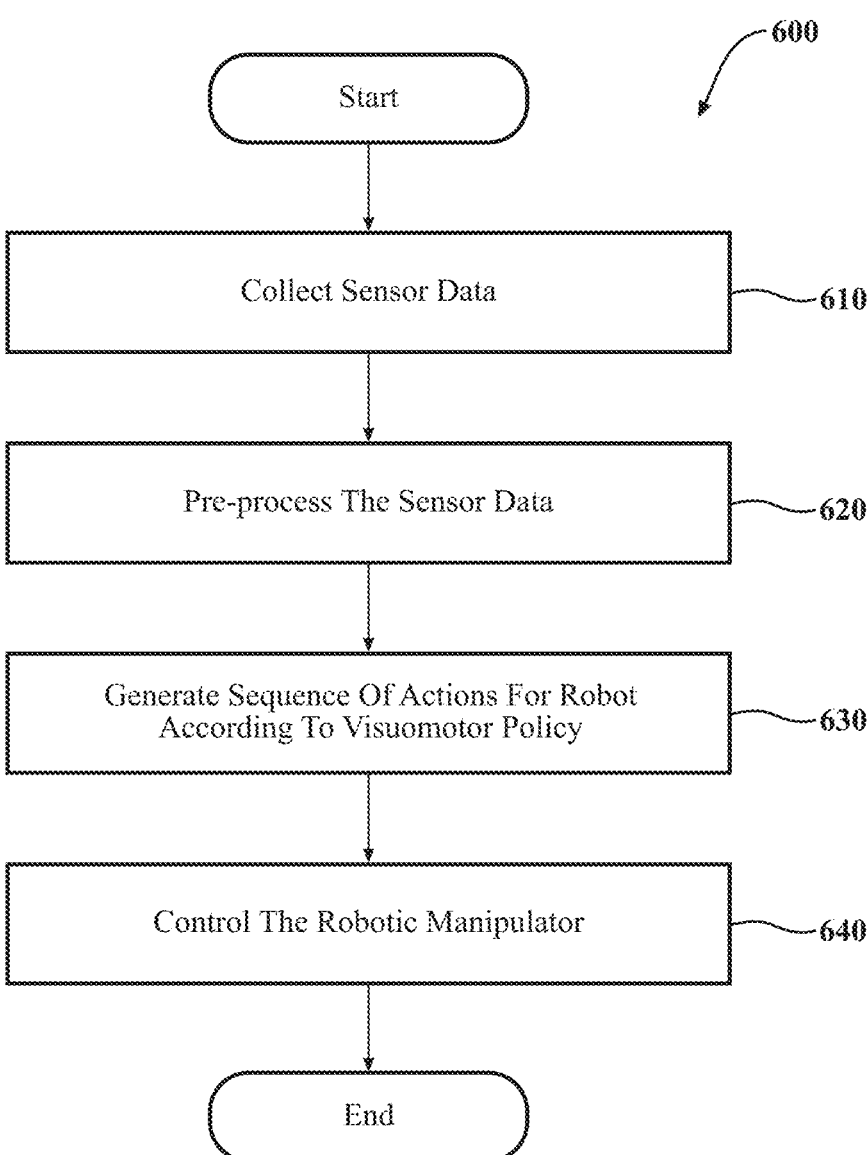
FIG. 6 is a flowchart illustrating one embodiment of a method for controlling a robotic device.

Additional aspects of controlling a robotic manipulator according to a device-agnostic policy will be discussed in relation to FIG. 6. FIG. 6 illustrates a flowchart of a method 600 that is associated with controlling a robotic device. Method 600 will be discussed from the perspective of the interface system 100 of FIG. 1. While method 600 is discussed in combination with the interface system 100, it should be appreciated that the method 600 is not limited to being implemented within the interface system 100 but is instead one example of a system that may implement the method 600.

At 610, the control module 120 acquires the sensor data 150. As indicated previously, the sensor data 150 indicates aspects about the robotic manipulator within an environment in which the device is operating. In general, the control module 120 collects the sensor data 150 from sensors associated with the robotic device, such as a camera mounted on the device, position sensors, and so on. Thus, the sensor data 150 generally includes at least images of an area in which the robotic manipulator is operating and, in particular, of the end-effector/gripper of the device.

At 620, the control module 120 pre-processes the sensor data 150. In one approach, the pre-processing involves at least compensating for an observation latency of at least one sensor associated with the robotic manipulator. Of course, the observation latency may include latencies associated with gripper control sensing, robotic arm position sensing, and so on. In any case, compensating for the observation latencies is, in part, how the control module 120 customizes the interface system 100 to interface with the robotic manipulator for control. In one arrangement, the control module 120 compensates for the observation latencies by aligning observation latencies between the sensors (e.g., camera, an end-effector, and a gripper) according to measured latencies. The measured latencies may be acquired via a pre-configuration process that is, for example, manual. The observation latencies are times associated with the sensors performing associated functions and delays in the sensors measuring and communicating the sensor data 150.

At 630, the control module 120 generates actions for the robotic manipulator to perform a task according to the sensor data 150 and the visuomotor policy 170. In general, the control module 120 generates the actions as a sequence of synchronized end-effector poses and gripper widths through a defined period of time. Thus, the actions provide a sequence of movements for the robotic manipulator to achieve the task.

At 640, the control module 120 controls the robotic manipulator using the generated actions. In order to achieve accurate control of the robotic manipulator, the control module 120 compensates for execution latencies of the robotic manipulator in performing the actions. As with the observation latencies, the control module 120 compensates for the execution latencies as a way to customize the control of the robotic manipulator using the visuomotor policy 170. As described previously, the control module 120 compensates for the execution latency by adjusting timing of execution of the actions to ensure the robotic manipulator reaches the synchronized end-effector poses and the gripper widths at desired times. In this way, the interface system 100 provides an adaptable system that is agnostic to the underlying hardware but can be customized according to the noted aspects to interface with a wide range of robotic devices.

Figure 7:
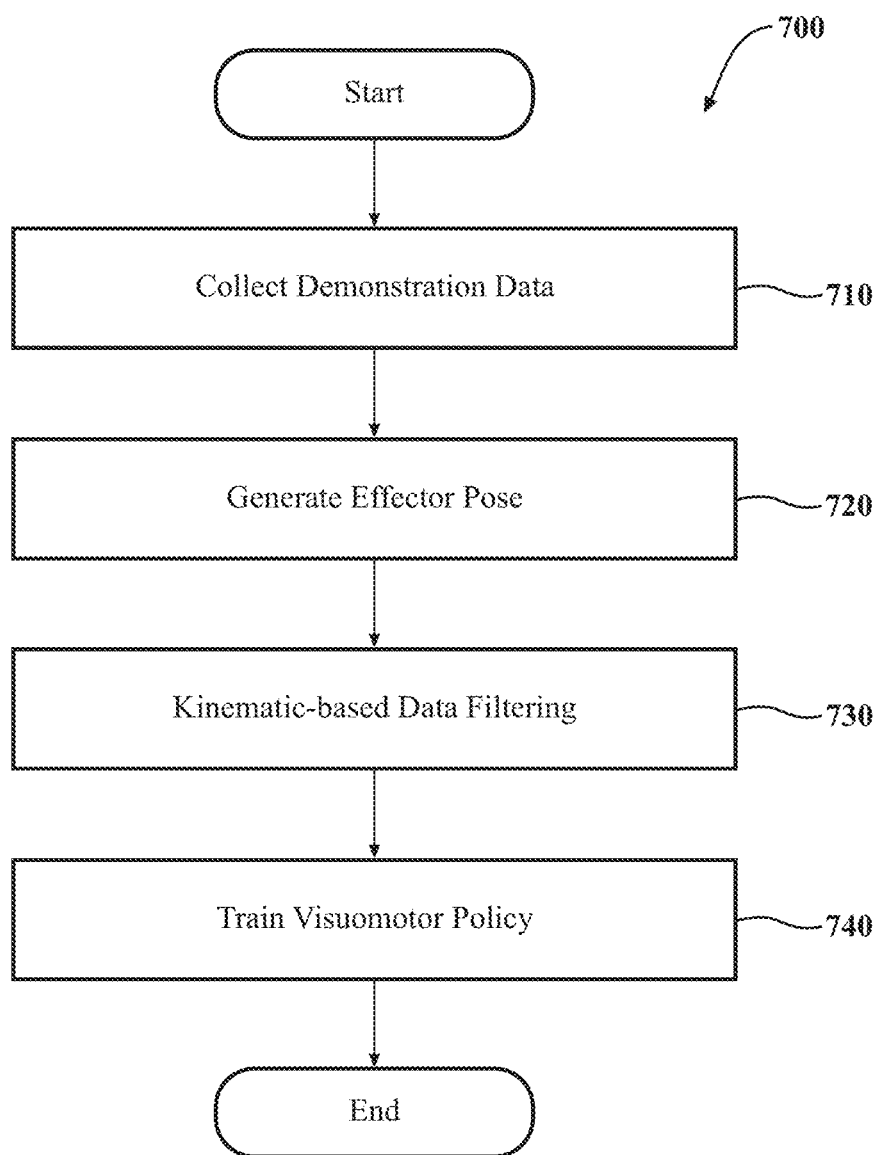
FIG. 7 is a flowchart illustrating one embodiment of a method for training a visuomotor policy.

Aspects of training a visuomotor policy to be device agnostic will be discussed in relation to FIG. 7. FIG. 7 illustrates a flowchart of a method 700 that is associated with controlling a robotic device. Method 700 will be discussed from the perspective of the interface system 100 of FIG. 1. While method 700 is discussed in combination with the interface system 100, it should be appreciated that the method 700 is not limited to being implemented within the interface system 100 but is instead one example of a system that may implement the method 700.

At 710, the control module 120 collects the demonstration data 160. In at least one arrangement, the control module 120 interfaces with sensors of a handheld gripper while the handheld gripper performs a task. The gripper may be manipulated by a human that uses the gripper to demonstrate the task. Thus, the control module 120 is able to collect the sensor data 150 from the sensors of the handheld gripper and process the sensor data into the demonstration data 160.

At 720, the control module 120 determines, using simultaneous localization and mapping (SLAM), 6 degrees of freedom (DOF) poses for the end-effector of the handheld gripper. The control module 120 may provide the demonstration data 160 as an input, including a series of RGB images and IMU measurements from the handheld gripper. From this information, the control module 120 executes the SLAM algorithm over the data to generate poses that are then integrated with the demonstration data 160.

At 730, the control module 120 filters the demonstration data 160 to find a subset of trajectory that is agnostic to the handheld gripper. The filtering is, in one or more arrangements, a kinematics and dynamics feasibility filtering. The resulting trajectories are independent of the particular device when used to train the policy, the policy does not learn particularities of a specific device.

At 740, the control module 120 trains the visuomotor policy 170 to learn the task according to the demonstration data 160, including the filtered trajectories. In general, the control module 120 performs imitation learning using the demonstration data 160, and the resulting visuomotor policy 170 is device agnostic.

As a further example of how the interface system 100 functions to control a robotic manipulator, consider FIG. 8. FIG. 8 illustrates a series of images 810-840 that depict a robotic manipulator positioned at a table with different objects, such as lego blocks, a ball, etc., sitting thereon. The visuomotor policy 170 has been trained using the handheld gripper to perform tasks of picking and tossing objects into separate bins that are positioned next to the table. Thus, as shown in the images 810-840, the interface system 100 controls the manipulator to pick the objects and separately toss them into the bins. Because of the mechanism of training and implementation for inference, the interface system 100 is able to compensate for device-specific aspects, such as the observation and execution latencies, while applying the motions/actions learned via the device-agnostic policy. This permits the interface system 100 to match the movements and avoid slowed or hastened trajectories from the latencies that would otherwise result in the dynamic actions of tossing and missing the target bins.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "operatively connected" and "communicatively coupled," as used throughout this description, can include direct or indirect connections, including connections without direct physical contact.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An interface system, comprising:

one or more processors;

a memory communicably coupled to the one or more processors and storing instructions that cause the one or more processors to:

collect sensor data about a robotic manipulator within an environment;

pre-process the sensor data to compensate for an observation latency of at least one sensor associated with the robotic manipulator, including instructions to align observation latencies between the at least one sensor, an end-effector pose, and a gripper width according to measured latencies;

generate actions for the robotic manipulator to perform a task according to the sensor data and a visuomotor policy; and control the robotic manipulator, including compensating for execution latency of the robotic manipulator in performing the actions.

2. The interface system of claim 1, wherein the visuomotor policy is device agnostic, wherein the instructions to pre-process the sensor data and compensate for the execution latency customize the actions for the robotic manipulator, and wherein the instructions to collect the sensor data include instructions to acquire at least images of the environment.

3. The interface system of claim 1, wherein the instructions to to align observation latencies include instructions to align observation streams of data according to a stream with a highest latency, and wherein the observation latencies are times associated with the at least one sensor, an end effector pose, and a gripper performing associated functions.

4. The interface system of claim 1, wherein the instructions to generate the actions include instructions to generate the actions as a sequence of synchronized end-effector poses and gripper widths, wherein the instructions to compensate for the execution latency include instructions to adjust timing of execution of the actions using the execution latency to ensure the robotic manipulator reaches the synchronized end-effector poses and the gripper widths at planned times; and wherein the actions are defined according to relative trajectories in relation to an end-effector.

5. The interface system of claim 1, wherein the instructions further include instructions to collect demonstration data from a handheld gripper while the handheld gripper performs the task, including instructions to determine, using simultaneous localization and mapping (SLAM), 6 degree of freedom (DOF) poses for an end-effector of the handheld gripper according to a series of images and IMU measurements from the handheld gripper.

6. The interface system of claim 5, wherein the instructions further include instructions to filter demonstration data to find a subset of trajectory that is agnostic to the handheld gripper, wherein the instructions to filter include instructions filter according to a kinematics and dynamics feasibility filtering.

7. The interface system of claim 5, wherein the instructions further include instructions to train the visuomotor policy to learn the task according to the demonstration data that has been filtered to be agnostic to the handheld gripper.

8. The interface system of claim 1, wherein the robotic manipulator is a different configuration of a robotic device from a handheld gripper that is used to acquire demonstration data for training the visuomotor policy.

9. A non-transitory computer-readable medium including instructions that, when executed by one or more processors, cause the one or more processors to:

collect sensor data about a robotic manipulator within an environment;

pre-process the sensor data to compensate for an observation latency of at least one sensor associated with the robotic manipulator, including instructions to align observation latencies between the at least one sensor, an end-effector pose, and a gripper width according to measured latencies;

generate actions for the robotic manipulator to perform a task according to the sensor data and a visuomotor policy; and control the robotic manipulator, including compensating for execution latency of the robotic manipulator in performing the actions.

10. The non-transitory computer-readable medium of claim 9, wherein the visuomotor policy is device agnostic, wherein the instructions to pre-process the sensor data and compensate for the execution latency customize the actions for the robotic manipulator, and wherein the instructions to collect the sensor data include instructions to acquire at least images of the environment.

11. The non-transitory computer-readable medium of claim 9, wherein the observation latencies are times associated with the at least one sensor, an end effector pose, and a gripper performing associated functions.

12. The non-transitory computer-readable medium of claim 9, wherein the instructions to generate the actions include instructions to generate the actions as a sequence of synchronized end-effector poses and gripper widths, wherein the instructions to compensate for the execution latency include instructions to adjust timing of execution of the actions using the execution latency to ensure the robotic manipulator reaches the synchronized end-effector poses and the gripper widths at planned times; and wherein the actions are defined according to relative trajectories in relation to an end-effector.

13. The non-transitory computer-readable medium of claim 9, wherein the instructions further include instructions to collect demonstration data from a handheld gripper while the handheld gripper performs the task, including instructions to determine, using simultaneous localization and mapping (SLAM), 6 degrees of freedom (DOF) poses for an end-effector of the handheld gripper according to a series of images and IMU measurements from the handheld gripper.

14. A method, comprising:

collecting sensor data about a robotic manipulator within an environment;

pre-processing the sensor data to compensate for an observation latency of at least one sensor associated with the robotic manipulator, including aligning observation latencies between the at least one sensor, an end-effector pose, and a gripper width according to measured latencies;

generating actions for the robotic manipulator to perform a task according to the sensor data and a visuomotor policy; and controlling the robotic manipulator, including compensating for execution latency of the robotic manipulator in performing the actions.

15. The method of claim 14, wherein the visuomotor policy is device agnostic, wherein pre-processing the sensor data and compensating for the execution latency customizes the actions for the robotic manipulator, and wherein collecting the sensor data includes acquiring at least images of the environment.

16. The method of claim 14, wherein the observation latencies are times associated with the at least one sensor, an end effector pose, and a gripper performing associated functions.

17. The method of claim 14, wherein generating the actions includes generating the actions as a sequence of synchronized end-effector poses and gripper widths, wherein compensating for the execution latency includes adjusting timing of execution of the actions using the execution latency to ensure the robotic manipulator reaches the synchronized end-effector poses and the gripper widths at desired times; and wherein the actions are defined according to relative trajectories in relation to an end-effector.

18. The method of claim 14, further comprising:

collecting demonstration data from a handheld gripper while the handheld gripper performs the task, including determining, using simultaneous localization and mapping (SLAM), 6 degree of freedom (DOF) poses for an end-effector of the handheld gripper according to a series of images and IMU measurements from the handheld gripper.

19. The method of claim 18, further comprising:

filtering demonstration data to find a subset of trajectory that is agnostic to the handheld gripper, wherein filtering is a kinematics and dynamics feasibility filtering.

20. The method of claim 18, further comprising:

training the visuomotor policy to learn the task according to the demonstration data that has been filtered to be agnostic to the handheld gripper.

\* \* \* \* \*